United States Patent
Kunkel

(10) Patent No.: US 7,827,009 B2
(45) Date of Patent: Nov. 2, 2010

(54) DETECTORS AND TECHNIQUES USEFUL WITH AUTOMATED ACQUISITION AND NOTIFICATION SYSTEMS

(75) Inventor: Daniel L. Kunkel, Chippewa Falls, WI (US)

(73) Assignee: ANS, Inc., Chippewa Falls, WI (US)

( * ) Notice: Subject to any disclaimer, the term of this patent is extended or adjusted under 35 U.S.C. 154(b) by 121 days.

(21) Appl. No.: 12/006,444

(22) Filed: Jan. 2, 2008

(65) Prior Publication Data

US 2008/0147358 A1 Jun. 19, 2008

Related U.S. Application Data

(63) Continuation of application No. 11/327,165, filed on Jan. 6, 2006, now Pat. No. 7,340,379.

(60) Provisional application No. 60/645,264, filed on Jan. 19, 2005.

(51) Int. Cl.
*G08B 1/08* (2006.01)
*G06F 17/40* (2006.01)
(52) U.S. Cl. .......................... 702/188; 702/32; 340/3.1
(58) Field of Classification Search ................ 702/22, 702/30, 32, 188
See application file for complete search history.

(56) References Cited

U.S. PATENT DOCUMENTS

| 4,793,799 | A | 12/1988 | Goldstein et al. |
|---|---|---|---|
| 5,945,915 | A | 8/1999 | Cromer et al. |
| 6,028,517 | A | 2/2000 | Sansone et al. |
| 6,433,684 | B1 | 8/2002 | Lie |
| 6,791,450 | B2 | 9/2004 | Gokcebay et al. |
| 6,816,074 | B2 * | 11/2004 | Wong ......................... 340/569 |
| 6,867,044 | B2 | 3/2005 | Cordery et al. |
| 6,882,269 | B2 | 4/2005 | Moreno |
| 6,963,357 | B2 | 11/2005 | Semones |
| 6,965,310 | B1 | 11/2005 | Hoben et al. |
| 6,972,677 | B2 | 12/2005 | Coulthard |
| 6,995,671 | B2 | 2/2006 | Dutta et al. |

(Continued)

FOREIGN PATENT DOCUMENTS

WO WO9743935 11/1997

(Continued)

OTHER PUBLICATIONS

Notice of Allowance dated Oct. 2, 2007 for U.S. Appl. No. 11/327,165.

(Continued)

*Primary Examiner*—Hal D Wachsman
(74) *Attorney, Agent, or Firm*—Patterson Thuente Christensen Pedersen, P.A.

(57) ABSTRACT

Sensors and techniques for an automated data acquisition and notification system having a plurality of receptacles adapted to store items. In each of the plurality of receptacles, at least one sensor is operated to detect a presence of an item in that receptacle. Light is emitted from a planar surface within the receptacle to a space within the receptacle opposite the planar surface. While that light is emitted light incident on the planar surface is detected. A determination is made whether an amount of light that is detected is significant to indicate a presence of the item.

20 Claims, 11 Drawing Sheets

U.S. PATENT DOCUMENTS

| | | |
|---|---|---|
| 7,151,447 B1 | 12/2006 | Willms et al. |
| 2002/0024438 A1 | 2/2002 | Roberson |
| 2002/0067262 A1* | 6/2002 | Lie .......................... 340/569 |
| 2002/0103868 A1 | 8/2002 | Khan |
| 2002/0113703 A1 | 8/2002 | Moskowitz |
| 2003/0134620 A1 | 7/2003 | Dutta |
| 2004/0030531 A1 | 2/2004 | Miller |
| 2004/0212502 A1 | 10/2004 | Dalgaard |
| 2005/0122220 A1 | 6/2005 | Staples |
| 2005/0253715 A1 | 11/2005 | Awobue |
| 2006/0073483 A1* | 4/2006 | White et al. .................. 435/6 |
| 2006/0095279 A1 | 5/2006 | Benco et al. |
| 2006/0095529 A1 | 5/2006 | McNamara et al. |
| 2007/0040673 A1* | 2/2007 | Bohine .................. 340/539.26 |

FOREIGN PATENT DOCUMENTS

WO    WO2005101334    10/2005

OTHER PUBLICATIONS

Office Action dated Jun. 12, 2007 for U.S. Appl. No. 11/327,165.

* cited by examiner

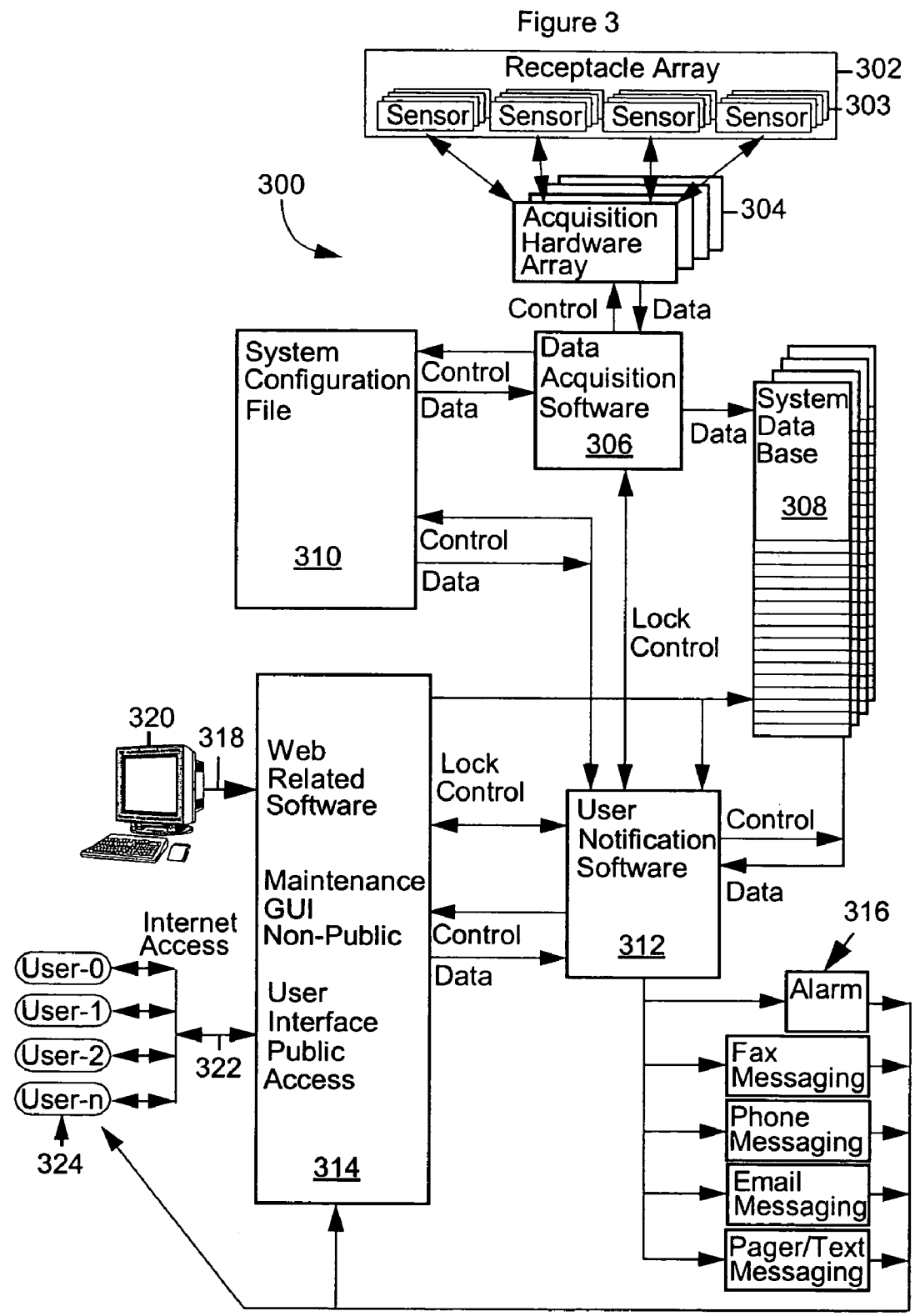

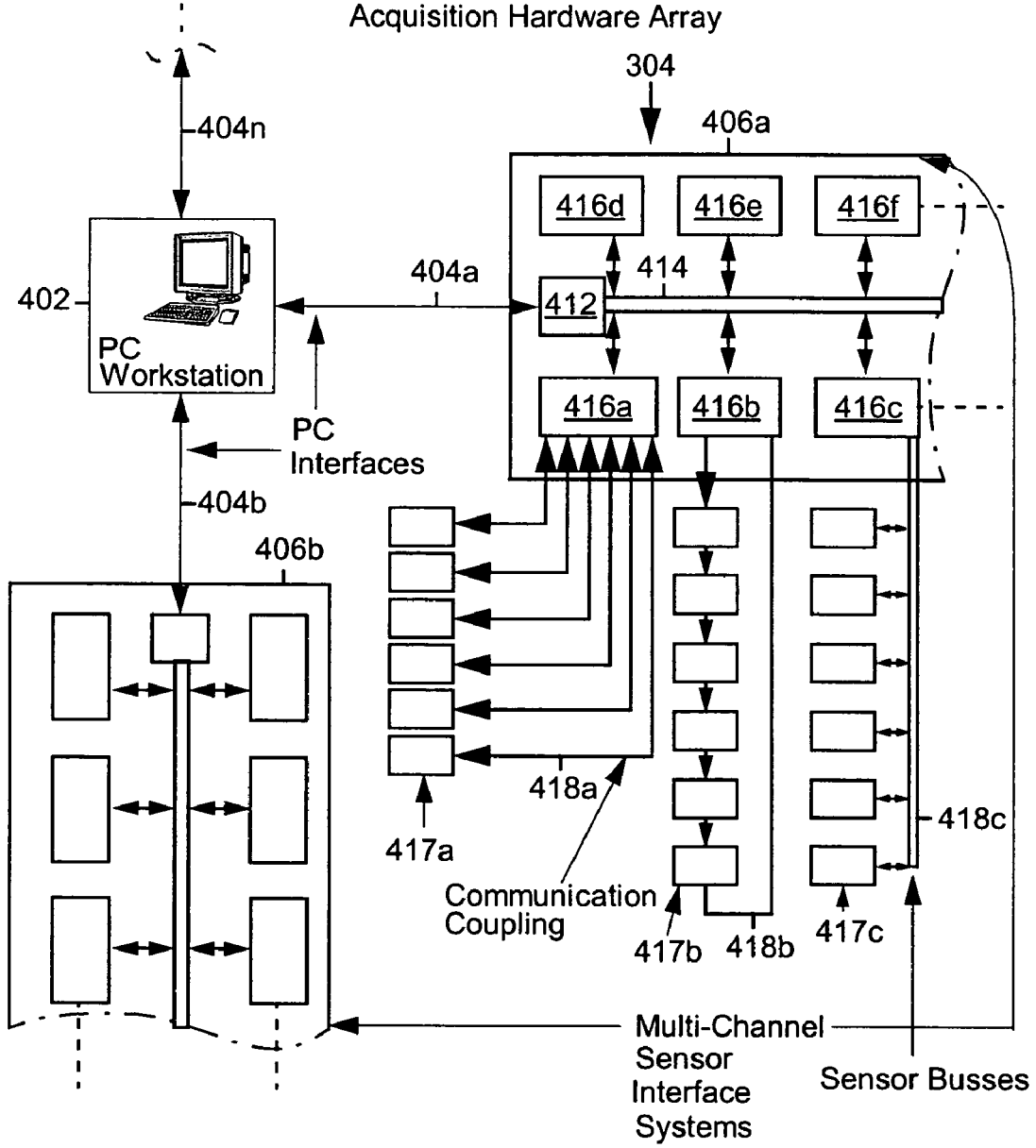

Interior Cabinet View

Rear Cabinet View

DETECTORS AND TECHNIQUES USEFUL WITH AUTOMATED ACQUISITION AND NOTIFICATION SYSTEMS

RELATED APPLICATIONS

This application is a continuation of U.S. patent application Ser. No. 11/327,165, now U.S. Pat. No. 7,340,379, filed on Jan. 6, 2006 and entitled "AUTOMATED ACQUISITION AND NOTIFICATION SYSTEM," which claims the benefit of U.S. Provisional Application No. 60/645,264 filed on Jan. 19, 2005, and entitled, "AUTOMATED ACQUISITION AND NOTIFICATION SYSTEM," both of which are incorporated by reference herein in their entirety

FIELD OF THE INVENTION

The invention relates generally to remote data gathering, and more particularly, to acquiring and reporting data representing a condition of, or contents present in, individual units of an array of receptacles.

BACKGROUND OF THE INVENTION

Many facilities, ships, and vehicles include an array of discrete storage receptacles. A receptacle herein refers to any installed container that is used for long-term or temporary storage of one or more items. Receptacles include, but are not limited to: storage bins, lockers, mail boxes, post office boxes, storage or shipping containers, lock boxes, and the like. Facilities, ships, or vehicles, such as airports, aircraft, trains, busses, train and bus stations, freighters, educational facilities, athletic facilities, theme and recreational parks, mail/parcel storage and/or collection/delivery facilities, hospitals, military bases, mini-storage facilities, government facilities, businesses, and the like, provide receptacles for the benefit of their customers or employees. These receptacles are intended for specific uses, such as personal storage or as a venue for transferring parcels. All have potential safety/security hazards, as well as potential content monitoring requirements. At present, there is no versatile system-wide approach for monitoring the contents of these receptacles to identify the presence of unacceptable materials, or even simply to identify the presence or absence of a physical object.

Managers of receptacle arrays may want to identify certain potentially hazardous materials that should not normally be present in a specified receptacle. These materials may include but are not limited to: Chemicals, Drugs, Explosives, Gunpowder Residue, Radioactive Material, Biochemical Agents, and other Hazardous Materials. A system solution for identifying these materials, and providing rapid notification to responsible authorities is desirable.

Managers of receptacle arrays may also want to identify the presence of certain environmental conditions in receptacles, in order to more rapidly respond to emergencies or events. These environmental conditions may include but are not limited to: fire, smoke, extreme temperature, moisture or humidity variations, and the like. An approach for specifically identifying the source or location of such events, and to provide rapid notification to responsible authorities is needed.

Managers of receptacle arrays or end users may also require the notification of the presence of physical objects located within a receptacle. This may include notification of the presence or change of any physical object within a receptacle, or may require identification and notification of the presence of specific objects within a receptacle. Users of these receptacles may need to know this information in a timely fashion. A way to specifically identify object physical presence or change in physical presence and timely notification of appropriate end users is desirable.

Presently, end users, managers of receptacle arrays, or responsible authorities are normally required to regularly physically access receptacles on-site to determine the presence of certain objects, hazardous materials, contraband, or environmental conditions specific to particular receptacles. This can be a time consuming, labor intensive and costly process.

SUMMARY OF THE INVENTION

Embodiments of the present invention provide a system, method, apparatus, and computer software for acquiring information and notifying an end user upon the detection of an event, specified item or object, or material within a receptacle. Various sensor technologies and techniques, scalable information acquisition hardware, and information management and system control software provide a system-level solution for detecting or identifying selected objects, material, conditions or events relating to any given receptacle. A notification system, including appropriately configured hardware and software, provides receptacle array managers or end users with selectable or programmable types and formats of notification.

One aspect of the invention includes a unified acquisition and notification system designed to acquire data from a variety of sensors integrated into an array of receptacles. The system is independent of the type of sensors/sensing system used. It provides a solution for gathering input from a large number of sensors, identifying certain conditions or events based on the sensor states or measurements, and providing automated notification to end users.

Another aspect of the invention includes a data acquisition and notification system having an array of receptacles with sensors adapted to observe at least one condition or event associated with at least one receptacle. A system database is configured to maintain data representing sensor information. Monitoring hardware is communicatively coupled to each sensor of the array of receptacles and controlled by a data acquisition program that causes the monitoring hardware to gather sensor information from the sensors and communicate the data representing the sensor information to the system database. The system also includes a notification sub-system communicatively coupled to the system database and adapted to issue notifications that are based on data maintained by the system database.

Applications of various aspects of the invention include security, safety, convenience, and homeland security concerns. The system enables managers of receptacle arrays to determine the type of sensing to be performed and provide an ability to detect the presence of a material, object, event or environmental condition (depending on sensor type) within a given receptacle and report that condition to end users, such as security authorities, building administrators, or personal users. End users can be notified privately and confidentially. Inspections of targeted storage receptacles, if called for, may then take place in a discrete or perhaps protective manner, depending on what a sensor has detected.

Embodiments of the invention can reduce current expensive and time consuming methods where law enforcement monitoring and inspection using trained animals and hand held sensing devices have been used. The system can quietly provide a sentry within each receptacle, in many cases hidden from the user, and can confidentially report the presence of a substance or event within seconds of placement or occurrence.

Embodiments of the invention can also provide a postal box facility with the capability of offering its customers timely, confidential and user-selectable notification that the customer has received mail. Such a system eliminates the need for the customer to make potentially time consuming, costly, and unnecessary trips to physically check the postal box only to find there is no mail present. Sensors placed within each box can monitor and detect when at least one piece of mail has been placed inside, or removed from the box. The system will subsequently notify the customer.

BRIEF DESCRIPTION OF THE DRAWINGS

FIG. 3 is a block diagram illustrating one example of a scalable system arrangement according to one example embodiment of the invention.

FIG. 4A is a block diagram illustrating one embodiment of an acquisition hardware array according to one example embodiment of the invention.

DETAILED DESCRIPTION

Figure 1:
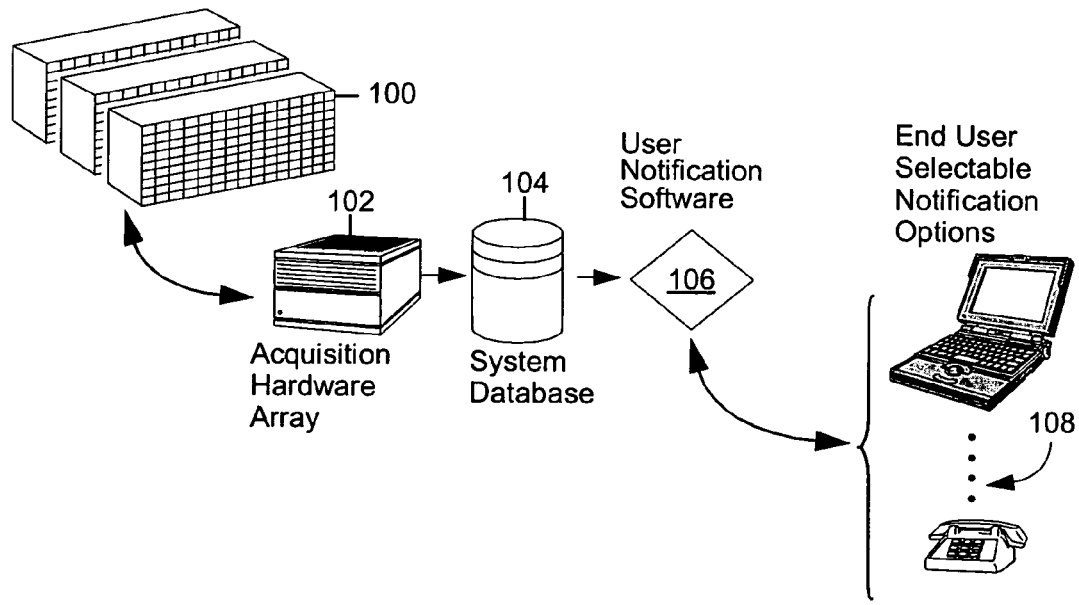
FIG. 1 is a block diagram illustrating a top-level system arrangement according to one example embodiment of the invention.

FIG. 1 illustrates a top-level system arrangement of a receptacle array data acquisition, storage, and user notification system according to one example embodiment of the invention. An array of receptacles 100 is configured so that each receptacle includes one or more sensors (not shown). Acquisition hardware array 102 is communicatively coupled to each of the sensors of receptacle array 100. Acquisition hardware array 102 is controlled by a computer executing an acquisition control program (not shown) that causes acquisition hardware array 102 to periodically retrieve the state of the enabled sensors within the receptacle array 100. The acquisition control program monitors when data acquisition cycles are complete and transmits sensor state or measurement information to a system database 104. System database 104 can be a central database, or a distributed database within the spirit of the invention. Each entry in system database 104 corresponds to a particular receptacle. Each entry in the system database 104 also includes one or more notification parameters. User notification software running on a computer causes the system to issue notifications to the end user according to the notification parameters. In one example embodiment, the notification parameters are based on pre-selected options made by an end user. The notification software code interrogates each database entry and, based on the state of the entry and notification choice, generates and issues the notification message to the end user.

Figure 2:
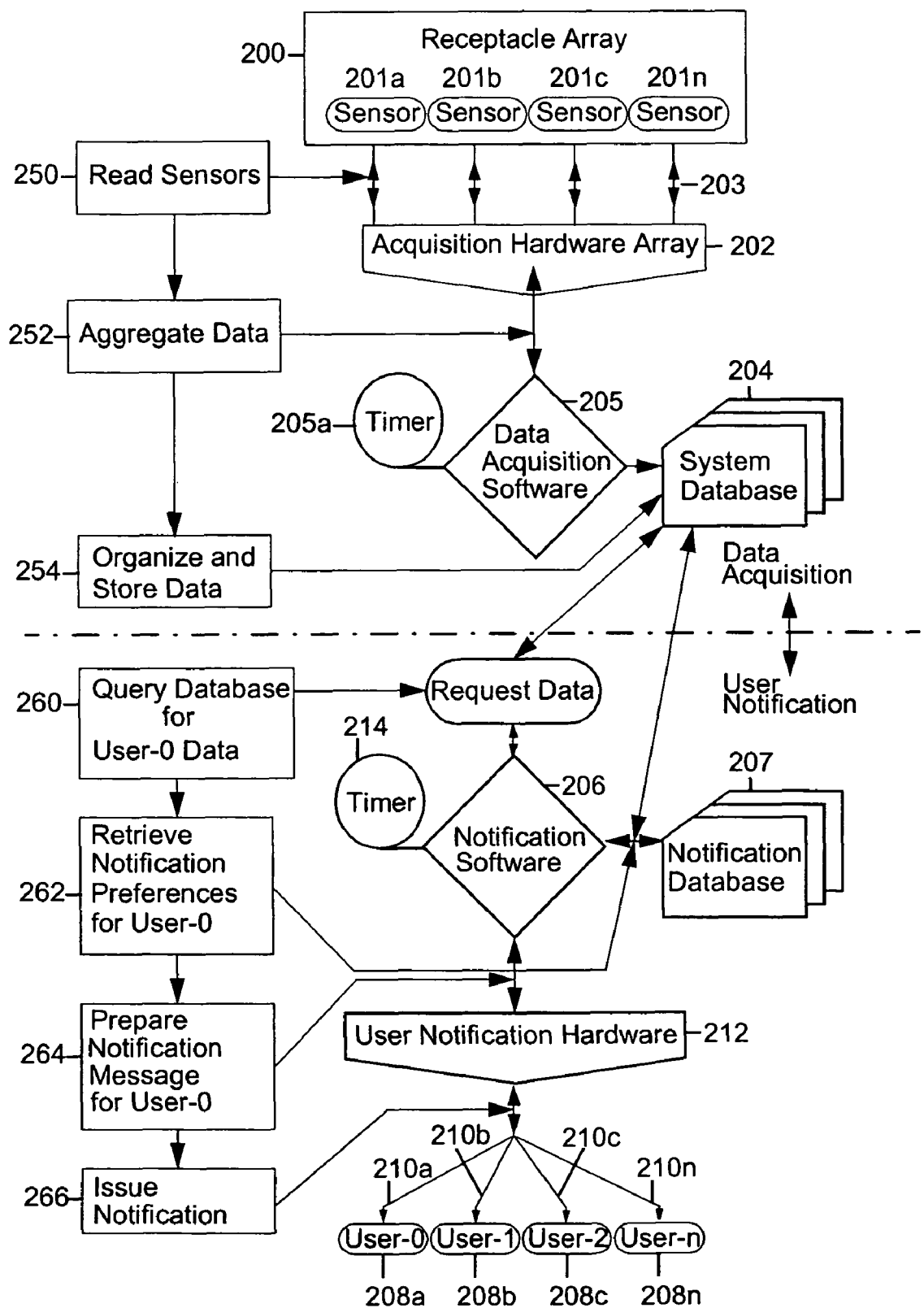
FIG. 2 is a flow diagram illustrating an example operation and data flow in a receptacle array data acquisition and user notification system according to one embodiment of the invention.

FIG. 2 illustrates an example of basic system operation. Receptacle array 200 includes sensors 201a, 201b, 201c, and 201n. Sensors 201a-201n may or may not be have a 1-1 correspondence with the receptacles of receptacle array 200, and with users 208a-208n. Acquisition hardware array 202 is communicatively interfaced via sensor interface 203 with each of the sensors 201a-201n. In one example embodiment, sensor interface 203 includes at least one electrical connection between a sensor and the acquisition hardware array 202. In another example embodiment, the sensor interface 203 includes at least one wireless link, such as a radio frequency (RF) communication channel.

At step 250, acquisition hardware array 202 reads one or more of sensors 201a-201n. In one example embodiment, reading a sensor by the acquisition hardware array 202 involves digitally communicating with a communications circuit local to each sensor 201a-201n. In this example, sensors 201a-201n include local circuitry for converting the signals representing the measured states or variables into digital representations suitable for communicating via the local communications circuits. In system arrangements where each receptacle has a plurality of sensors, an A/D multiplexer local to each receptacle can accept inputs from each sensor in the receptacle and distribute power to each of the sensors. In one example embodiment, the local A/D multiplexer can read the sensors, convert the sensor information into a digital representation, aggregate the sensor data into memory, and transmit the sensor information for all of the sensors in the receptacle to acquisition hardware array 202.

In an alternative embodiment, the acquisition hardware array 202 receives analog signals from sensors 201a-201n and performs the analog to digital (A/D) conversion. In this embodiment, acquisition hardware array 202 can include a suitable power source for enabling the use of sensors providing a current or impedance output. In a related embodiment, the acquisition hardware array includes both digital communications circuitry for receiving pre-converted sensor data from some sensors having digital signal output as well as a power source, analog front end and/or A/D circuitry, for receiving sensor signaling from other sensors having analog signal output. In this regard, the term sensor information herein refers to analog or digital signals representing the sensor states or measurements, as well as to digital data representing the same.

At step 252, acquisition hardware array 202 arranges the collected data into a format suitable for transferring to system database 204. In one example embodiment, a data processor of acquisition hardware array 202 aggregates the sensor information collected from each sensor 201a-201n into one or more messages, data frames, or data structures, and communicates the sensor information to system database 204. Data acquisition software 205 runs on the data processor and includes instructions to accomplish the functionality of acquisition hardware array 202. According to one example embodiment, data acquisition software causes acquisition hardware array to collect the sensor information on a cyclical, or periodic basis. In this embodiment, data acquisition software 205 utilizes timer delay function 205a for making data acquisitions at preconfigured data capture intervals.

At step 254, system database 204 receives the collected sensor information, and organizes the information into database records corresponding to each of the individual receptacles of receptacle array 200. In one example embodiment, the database records include historical sensor information for each sensor collected during earlier data capture intervals. To facilitate the management of sensor data acquired over a period of time, the database records can include a time stamp corresponding to the time when the associated sensors were read. In one example embodiment, the records of system database 204 include logical relationships between different fields of the same record, or between corresponding fields of different records. For example, a logical relationship can include a time stamp comparison and a sensor state comparison between two consecutive records for the same receptacle. The application of this logical relationship determines whether a state change occurred during a given period of time.

The gathered sensor information is stored in system database 204 for use during a notification cycle. Each facility administrator or receptacle array manager may choose the frequency for acquisition and notification as well as what services will be provided to end users 208a-208n via corresponding user interfaces 210a-n. Notification software 206 runs on user notification hardware 212 and interfaces with system database 204. In one example embodiment, user notification hardware 212 shares at least one common hardware component with acquisition hardware array 202. In an alternative embodiment, user notification hardware 212 is physically distinct equipment communicatively coupled to the data acquisition portion of the example data acquisition and user notification system.

Notification software 206 also interfaces with users 208a-208n via the user interfaces 210a-210n. The end users 208a-208n can select from available choices as to which type of user interface 212 they wish to utilize for receiving notification. Options include: voice message, electronic mail, text message, fax, electronic or hard-wired alarm notification, or interactive access via a website. In one system embodiment, users 208a-208n can each select the format and content of the notification message they wish to receive. Each user 208a-208n may also choose the frequency of notification to best suit their individual needs based on available choices from the provider. In one example embodiment, notification preference information, potentially including interface options, notification message format and/or content, and notification frequency, is stored in system database 204. In an alternative embodiment, the notification preference data is stored in optional notification database 207.

In one example embodiment, a programmable timer 214 managed by notification software 206 initiates each notification cycle. According to one example notification cycle illustrated in FIG. 2, at step 260 notification software 206 obtains receptacle information based on sensor information corresponding to the receptacle used by one or more users, such as User-0 208a. The receptacle information can include sensor state data or measurements, as well as any processed conclusions based on the logical relationships between data fields described above. At 262, notification software 206 running on notification hardware 212 retrieves the notification preferences of User-0 208a. In one embodiment, the preferences are stored in database 204. Alternatively, the preferences are stored in notification database 207. Based on the notification preferences, at step 264, notification software 206 prepares a notification message for User-0 208a including the applicable sensor information or processed conclusions obtained from the sensor information. At 266, notification software 206 causes user notification hardware 212 to issue the appropriate notification to User-0 208a.

Scalable Architecture and System Operation

FIG. 3 is a system block diagram illustrating one example of a scalable, or expandable, system architecture according to one example embodiment of the invention. Example data acquisition and notification system 300 includes an array of receptacles 302. In one example embodiment, receptacle array 302 includes a plurality of receptacles, each receptacle having a sensor set 303 of at least one sensor. Each receptacle's set of sensors 303 can include multiple sensors for detecting a variety of different events or conditions. It is also possible for a set of sensors 303 to include multiple sensors of the same type either for redundancy or for increased sensitivity or increased physical sensor coverage area/volume. In one example embodiment, the notification portion of system 300 (described in greater detail below) can be configured to provide unique notification choices for the user corresponding to each type of sensor in the user's receptacle.

Sensor types within receptacle array 302 can include, but are not limited to: infrared, ionic, photonic, mechanical, pressure, temperature, chemical, radioactive, capacitive and inductive. The sensors within each receptacle provide reliable detection of an event, an object having certain detectable or measurable characteristics, one or more environmental conditions, or material. Examples of types of detectable materials of interest include explosives or toxic materials, such as gunpowder residue or radioactive materials. Also, material having certain physical properties can be detected by suitable sensors regardless of its chemical composition. Examples include smoke or other particulate matter. Those with ordinary skill in the art will recognize that the system architecture and method of operation according to the invention can be compatible with, or adaptable to work with any type of sensing technology. In one example embodiment of receptacle array 302, the sensors of each receptacle are ruggedized, or protected against extreme environmental conditions such as extreme temperatures, humidity, and/or vibration. In a related embodiment, the sensors of each receptacle are protectively housed to prevent unauthorized tampering by users of the receptacles.

Expandable Acquisition Hardware Array

One example embodiment of acquisition hardware array 304 is illustrated in FIG. 4A. Acquisition hardware array 304 includes a PC workstation 402, which is interfaced with multi-channel sensor interface systems 406a and 406b. Sensor interface systems 406a and 406b interface with PC workstation 402 via a PC interfaces 404a and 404b, respectively. This embodiment of hardware acquisition array 304 is further scalable with the addition of more sensor interface systems, as represented by open-ended PC interface 404n in FIG. 4A. PC interface 404a can be any suitable interface with PC workstation 402. Examples of suitable interfaces include SCSI bus, PCI bus, IDE Interface, RS-232/485, USB, and the like. In these examples, PC interface 404a can be considered a high-bandwidth communication channel.

Figure 4B:
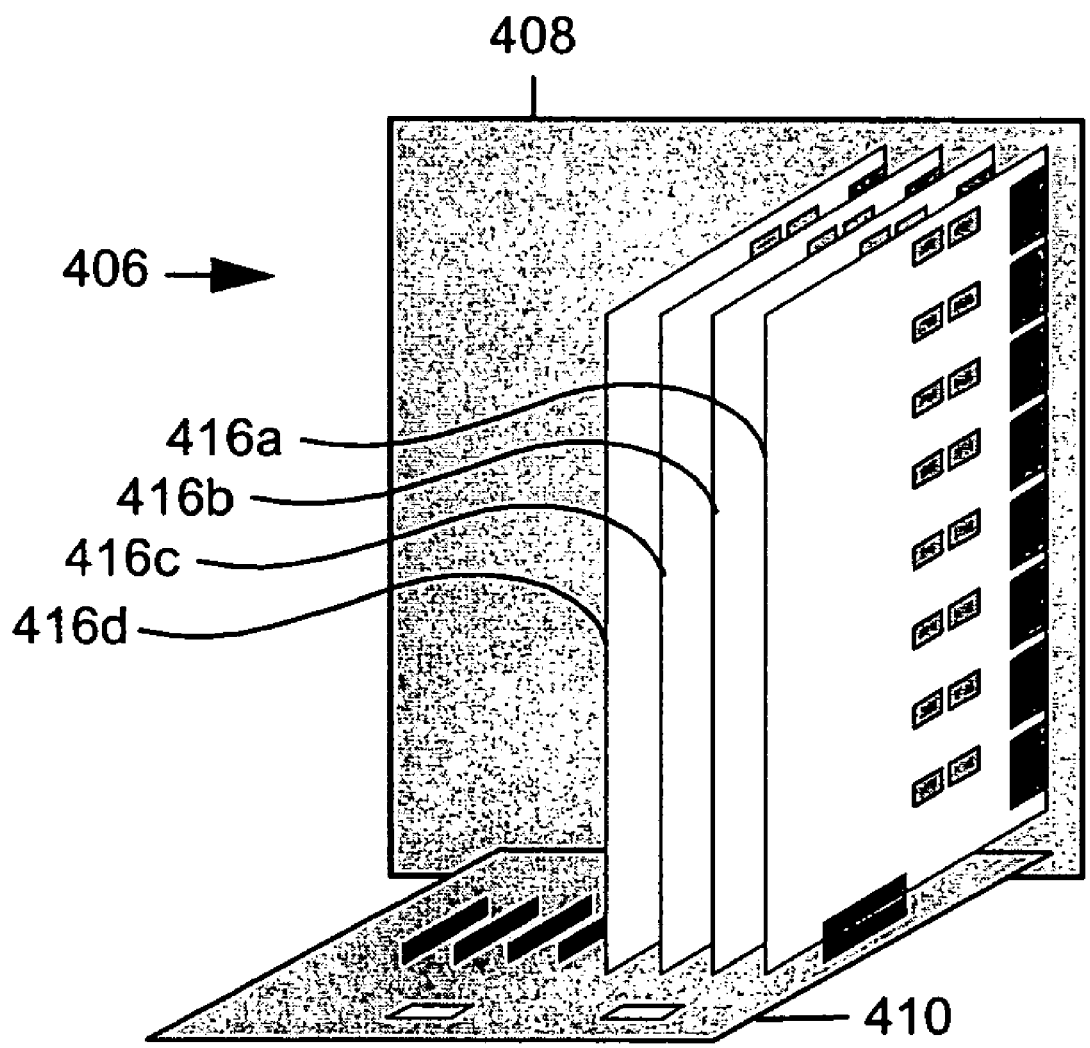
FIGS. 4B and 4C are diagrams illustrating an interface system physical arrangement according to one example embodiment of the invention.
Figure 4C:
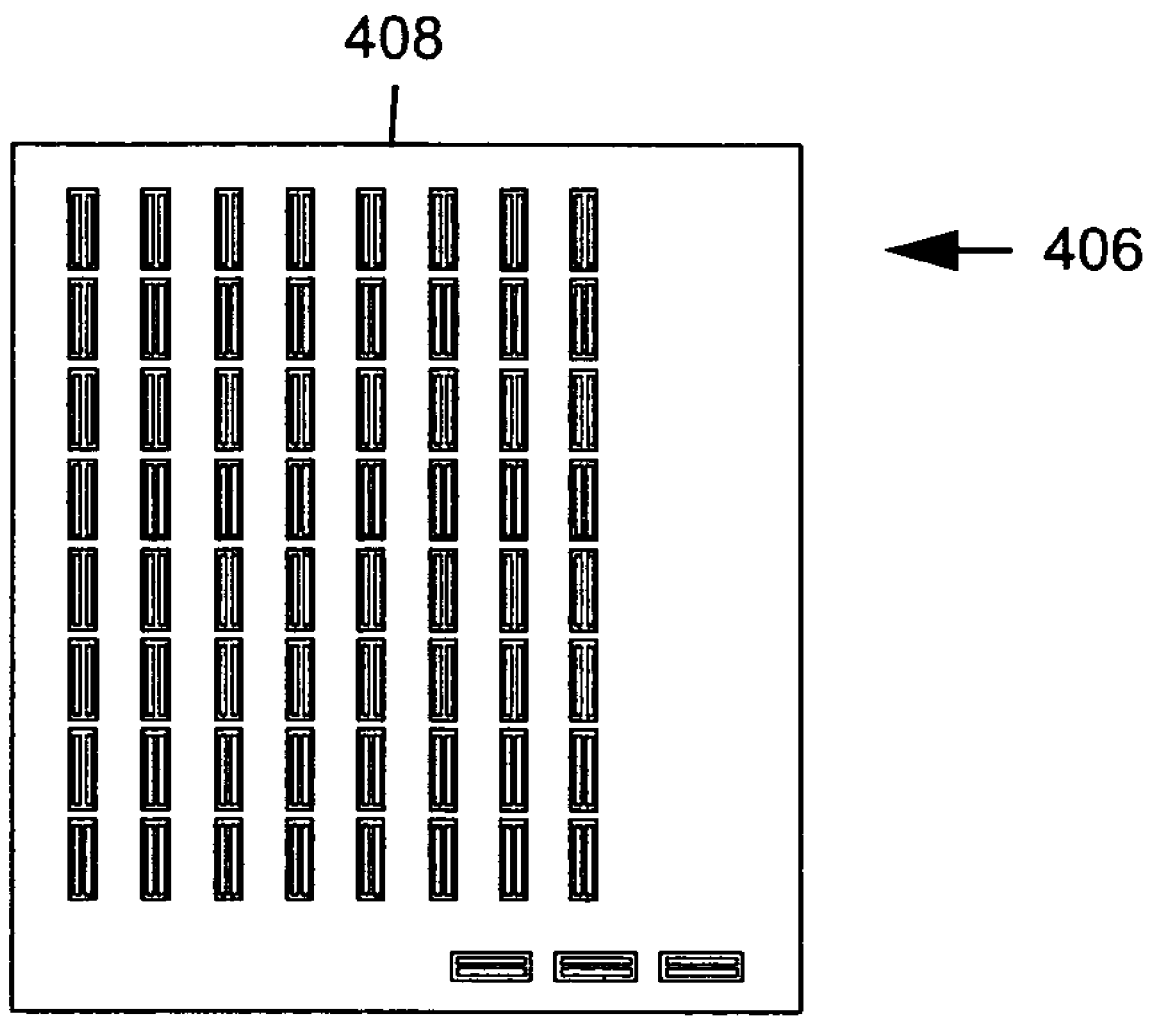

FIGS. 4B and 4C illustrate an example embodiment of a sensor interface system 406. Sensor interface system 406 includes an enclosure 408, and a motherboard/backplane 410. Motherboard/backplane 410 includes interface circuitry 412 and an interface bus 414 (FIG. 4A). One or more multi-channel sensor interface cards 416 are coupled to motherboard/backplane 410. Alternatively, in one embodiment, PC interface 404 connects directly to each interface card 416.

Each interface card 416 includes communications connectivity to a corresponding groups of sensors. For example, referring to FIG. 4A, interface card 416a is communicatively coupled to multiple groups of sensors via low-bandwidth sensor busses 417a1-417a6. Each sensor bus 417a communicates with a group of sensors (not shown) via nodes. Each sensor bus 417a is coupled with interface card 416 via communications coupling 418a1-418a6, respectively. Each sensor bus 417 can be thought of as a node on corresponding communications coupling 418. Likewise, interface cards 416b and 416c are respectively communicatively coupled to low-bandwidth sensor busses 417b1-417b6 and 417c1-417c6 via communications couplings 418b and 418c, respectively, as depicted in FIG. 4A.

In one example embodiment, each low-bandwidth sensor bus 417 is implemented as a Dallas(R) 1-wire bus. Sensors on sensor bus 417 are individually addressable. In various related embodiments, sensor bus 417 can be a wireless technology such as Bluetooth, or IEEE 802.11. Alternatively, an arrangement compatible with, or analogous to, IEEE P1394 is utilized. Sensor bus 417 can take on any suitable architecture, wired, or wireless.

Communications couplings 418 can also take on a variety of architectures (wired or wireless) within the spirit of the invention. For example, communications couplings 418a are depicted in FIG. 4A as a hub-and-spoke, or fabric-type arrangement; communications couplings 418b are organized in the form of a daisy chain-type arrangement; and communications couplings 418c are a bus-type arrangement. The physical interconnection, if any, of communications couplings 418 between the sensor busses 417 and interface cards 416 can also include supply power-carrying conductors. In one embodiment, communications coupling is implemented as an $I^2C$ bus.

Figure 4D:
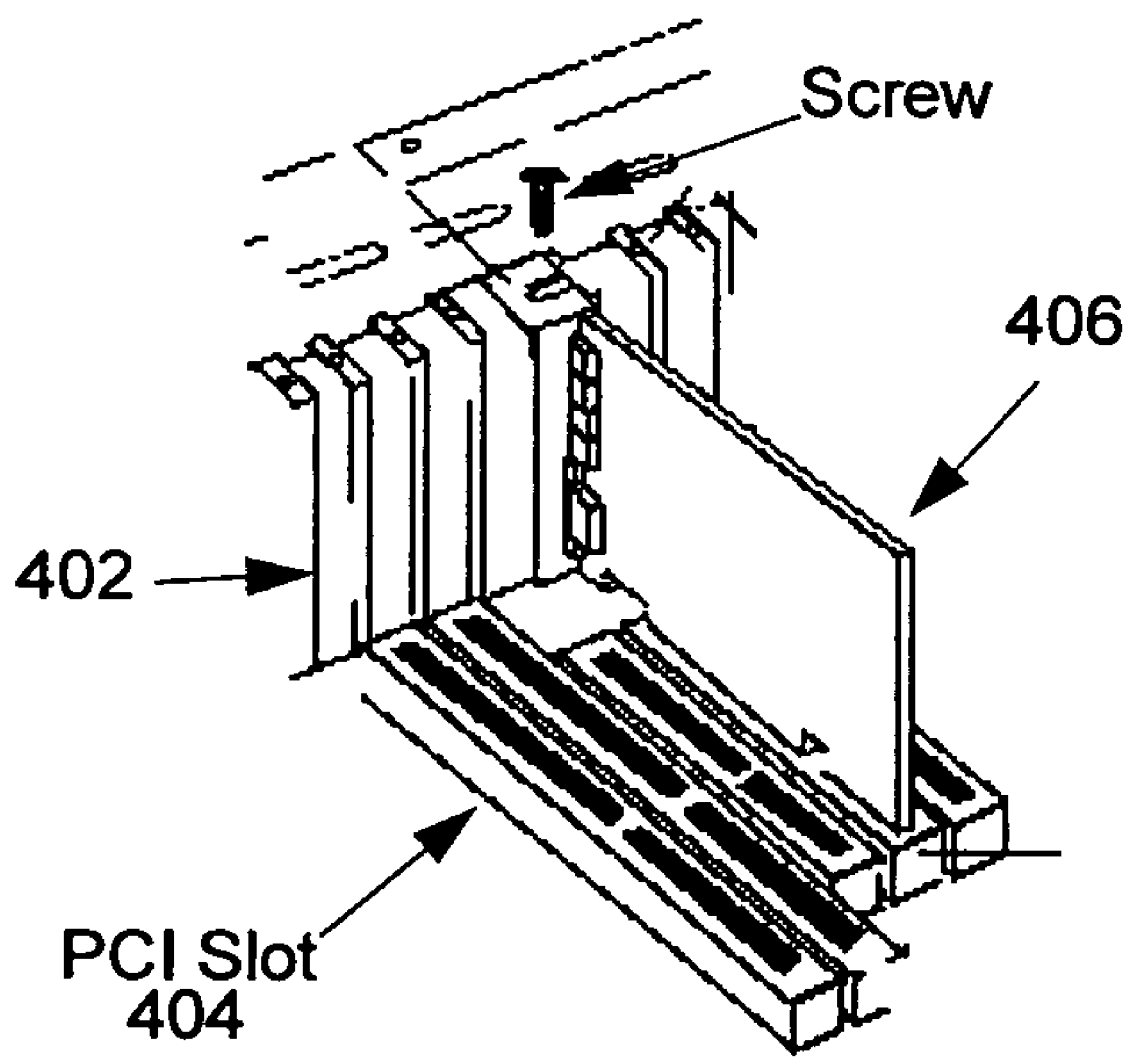
FIG. 4D is a diagram illustrating another embodiment of a physical arrangement of an interface system according to one example embodiment of the invention.

In another example embodiment, multi-channel sensor interface system 406 is physically implemented on a single circuit board, and has no dedicated enclosure or motherboard/back plane. FIG. 4D is a diagram illustrating this embodiment. Sensor interface system 406 is a circuit card that is adapted to be physically installed inside the enclosure of PC workstation 402. As depicted in FIG. 4D, sensor interface system 406 can be installed in PC workstation's 402 PCI expansion slot 404.

In one example embodiment, each interface card 416 includes general-purpose input-output ports, which can be used to interface with sensors, as well as with actuators assigned to receptacles or generally to the receptacle array. In another embodiment, sensor interface card 416 includes an expansion port that interfaces with other interface cards 416. In this arrangement, one sensor interface card 416 serves as a master, while other interface cards 416 serve as slaves.

The logical arrangement between different groups of sensors can also be diverse within the spirit of the invention. For example, referring to FIG. 4A, the sensors of sensor bus 417a can all be proximity sensors, each sensor assigned to a different receptacle of receptacle array 302. In this example, the sensors of sensor bus 417b can all be explosive material sensors, each sensor assigned to a different receptacle, and paired with a corresponding proximity sensor assigned to the same receptacle. In alternative arrangements, sensors of the groups 417 can include sensors of various types, and each receptacle can have sensors from a single interface card 416 or from multiple interface cards 416. As described below, a system configuration file 310 associates the sensors of each sensor set 303 with one another, and associates each sensor set 303 with a particular receptacle.

The architecture and arrangement of acquisition hardware 304 is versatile in the sense that additional sensors and sensor busses 417 can be added or removed, and the associations of sensors to sensor sets 303, and sensor sets to receptacles of receptacle array 302, can be re-defined accordingly, without major system overhaul. In one embodiment, acquisition hardware array 304 is a scalable design in which hardware can be added and removed easily from the system by adding or removing modules or acquisition cards. Hardware modifications can be accompanied by simple configuration setting adjustments in system configuration file 310 by an administrator to re-configure data acquisition software according to the hardware modifications.

Sensors

A variety of different sensor technologies can be accommodated by the acquisition system of the present invention including, optionally, simultaneously monitoring receptacles with multiple types of sensors. Sensor bus 417 utilizes a given communications interface and protocol, for which different sensors can be adapted to communicate over. In one embodiment of a sensor, the sensor includes the transducer, circuitry for stimulating and/or reading the transducer, and communications circuitry for interfacing with sensor bus 417. Optionally, sensors include on-board processing capability with data storage and analysis. For example, a sensor can include an analog-to-digital converter (ADC) interfaced with a microprocessor or digital signal processor (DSP) system that includes a processor core, input/output circuitry, and memory. Advantages of local processing at the sensor include the ability to gather and store sensor information between communication cycles, and the ability to aggregate the data to provide statistical output (such as time averages, and the like). Data storage also enables transmission of large amounts of data over the sensor bus via burst mode communications.

In one type of sensor arrangement, multiple like sensors are installed within a single receptacle. Multiple sensors can provide separate individual detections, or can be aggregated to support additional detection intelligence. For example, multiple overlapping detections can be analyzed via software or other logic to validate a positive detection.

In one type of object detection sensor, the transducer includes a photovoltaic cell that converts light energy into an electrical signal. Advantages of the use of photovoltaic cells include high sensitivity and the ability to detect reflected light over a wide range of angles of incidence. In one example embodiment, a sensor includes a photovoltaic cell and a light emitter, such as a set of light-emitting diodes (LEDs). The sensor is mounted in a receptacle that has an interior that absorbs the light emitted by the diodes. When the diodes emit light, the photovoltaic cell does not detect any significant portion thereof. This can be accomplished, for example, by placing the photovoltaic cell in the same plane as the LEDs. When certain material of interest is placed in the receptacle, however, the light from the LEDs reflects off of the material, and is picked up by the photovoltaic cell. Measuring circuitry determines if the amount of light detected by the photovoltaic cell is significant to signal a detection of the presence of the material.

In one example embodiment, multiple photovoltaic detectors are present within a single receptacle. In this arrangement, the sensitivity of the detector is significantly improved due to the increased detection range and coverage area provided by the multiple sensors. This arrangement is especially useful in larger-sized receptacles such as shipping containers, and in lockers having compartments or dividers.

In a related embodiment, photovoltaic detectors are positioned in multiple planes. Multiple plane detectors can be configured to provide a virtual 3 dimensional detection area.

In another type of embodiment, sensors are implemented together with data analysis capability to provide a sensor system capable of heuristic learning and automatic adaptation. For example, photovoltaic sensors can be used to make multiple measurements of the amount of ambient light, which is then logged as a function of time by the data analysis circuitry. Over controlled time intervals, the analysis circuitry can establish probabilistic-based characterizations of what to expect for a measured value between empty and non-empty receptacles. This type of learning can be accomplished by storing a digital value from A/D-converted measurements and using the stored values as a baseline reference for future detections. This technique allows for the sensor logic to self-adapt to conditions that may occur over time that would otherwise reduce detection capabilities such as, for example, a dirty container, a component fault, and the like. The sensor baseline information can be stored within the system database as well as in the sensor system's logic and can be interrogated during acquisition cycles. Additionally, the data logging can be utilized to provide a history of environmental conditions existing within the receptacle.

Data Acquisition Software and Data Structures

Referring again to FIG. 3, data acquisition software 306 provides a link between acquisition hardware 304 and system database 308. In one example embodiment, the operation of data acquisition software 306 includes interrogating enabled sensors by controlling the supply of power to the sensors and reading sensor data. Acquisition software 306 refers to system configuration file 310 to obtain the logical relationships between the various sensors of receptacle array 302, and sensor information acquisition parameters, such as acquisition frequency, or sampling rate. In this regard, the system configuration file generally provides a link between the physically-acquired sensor information, and the corresponding entries within system database 308. System configuration file 310 also provides validation of active (enabled) sensors in the system. Data contained in system configuration file 310 establishes a functional link between each sensor and receptacle, and between each receptacle and notification recipient. Table 1 below contains example content of system configuration file 310.

TABLE 1

Example System Configuration File Content

| Field Name | Definition |
|---|---|
| Client Identification | Unique Number assigned to the local Site. Used within the PHP server to ensure site specific data is maintained. |
| Refresh Period | User defined value (in minutes) to base the frequency of updates to the Central Server. Updates will ensure that the local server configuration file and central database are synchronized with each other. If timestamp values are changed, the refresh period would set the necessary bits in the local configuration file. |
| Poll Period | User defined value (in minutes) to base the frequency of configuration file accesses from the PHP software interface. |
| Timestamp Frequency | Used to inform acquisition software as to number of acquisitions per 24-hour timeframe. Timestamps will in most cases remain static once a site specific pattern is established. |
| Timestamp Value | Times of day to sample. Time(s) selected to be the most efficient for each site. |
| Sensor Bank Number | Cross reference between sensor number stored in the configuration file and physical mapping to hardware. |
| Sensor Number | Specific receptacle sensor, used to isolate sensing activity to a single location. |
| Sensor State Status | Field used to record the state of the sensor. |

TABLE 1-continued

Example System Configuration File Content

| Field Name | Definition |
|---|---|
| Notification Flag | Field used by notification software to determine if selected notification methods have occurred for this particular sensor. If the notification field is not set, appropriate actions will take place for a specific sensor. Once notification takes place, the next update of the configuration file will find this field set. |

In one example embodiment, system configuration file 310 is configured to accommodate a receptacle array 302 in which each single receptacle is monitored by 3 sensors: object, temperature, and smoke. The system configuration file can include configuration information to permit acquisition and notification system 300 to generate and issue a notification to one or more appropriate responders based on different types of detected events or conditions. To this end, system configuration file 310 can be configured such that if the presence of an object is detected by an object sensor in a particular receptacle, data acquisition software 306 will instruct user notification software 312 (discussed below in greater detail) to generate and issue an e-mail notification to the appropriate end user associated with the receptacle. If a temperature event is detected, such as a temperature being measured that is outside of a predefined permissible range, data acquisition software 306 will instruct user notification software 312 to place a telephone call and send an e-mail notification to the facility manager of receptacle array 302. If either smoke or an extreme temperature event are detected, data acquisition software 306 will instruct user notification software 312 to place a call to an emergency or security center.

In one example embodiment, system database 308 contains a central repository for hardware status, notification type, form, and content selections, notification frequency selections, and end user information. Database 308 can be managed via operator interface 314 (described in greater detail below), and via operation of data acquisition software 306 and user notification software 312. Table 2 below depicts an example database record of database 308.

TABLE 2

Example Database Record

| Field Name | Definition |
|---|---|
| Index Number | Number of Entries |
| State of Entry | 1 = Box contains something, 0 = Box empty |
| First Name Space | user name |
| Last Name | billing address |
| E-mail Notification? Space | 1 = Enable, 0 = Disable |
| E-mail Address Space | |
| Voice Notification? Space | 1 = Enable, 0 = Disable |
| Voice Phone Number Space | |
| Pager Space | 1 = Enable, 0 = Disable |
| Pager/Number Space | |
| Text Message? Space | 1 = Enable, 0 = Disable |

TABLE 2-continued

Example Database Record

| Field Name | Definition |
|---|---|
| Text Message | You Have Mail!* This could be fixed or allow user up to 20 characters for personal customizing. |
| Space | |
| Fax Notification? | 1 = Enable, 0 = Disable |
| Space | |
| Fax Number | You Have Mail!* This could be fixed or allow user up to 20 characters for personal customizing |
| Space | |
| Notification Frequency | 000-None<br>001-1 per 12-hrs<br>010-2 per 12-hrs<br>011-3 per 12-hrs<br>100-4 per 12-hrs<br>101-hourly<br>110-30 minutes<br>111-1 minute |
| Space | |
| Time of last acquisition | The field will record the time of the last update from the Data Acquisition Software |
| Time of last notification | This field will record the time of the last notification cycle for this entry. |
| User Password | Used for Authorization Purposes for remote access by user. |

User and Maintenance Operator Input/Output

The function of user notification software 312 includes providing a data transport mechanism for delivering sensor information stored in system database 308 and user selected notification choices to the notification engines 316 which perform the actual user notifications. The user notification software interfaces with operator interface 314, data acquisition software 306, and system configuration file 310 to synchronize system software and guarantee accurate operation.

Operator interface 314 provides input and output for system software components, including system data acquisition software 306, system database 308, system configuration file 310, and user notification software 312. In one example embodiment, operator interface 314 includes a console interface 318 for a system administrator or manager 320 of receptacle array 302 responsible for system maintenance. The console interface 318 can access the system software components and enable data entry as well as maintenance and analysis. Console interface 318 can be a graphical user interface (GUI) to facilitate menu-driven user-friendly access. Operator interface 314 also includes a user interface 322 for end users 324 of receptacle array 302. The user interface 322 facilitates user preference configuration by users 324, and can also provide a mode of notification. User interface 322 can also be a GUI. In one example embodiment, console interface 318 and user interface 322 are each network-accessible via a secure internet connection.

In one example embodiment, console interface 318 provides private back door access for entry into system files. Those with ordinary skill in the art will recognize that the maintenance console used by administrator/manager 320 may be any suitably-programmed client terminal of a variety of manufacturer types and operating systems. System configuration file 310 can be manually or automatically set up for a new end user account through console interface 318. The contents of newly-updated system configuration file 310 will then be synchronized with system database 308. Once a user account has been activated, the new end user may access their personal database entry and have controlled access to modify notification selections as well as monitor current status of their receptacle via user interface 322. Depending on venue-specific acquisition cycles, an end user can receive notifications almost immediately after system configuration file 310 and system database 308 have been configured with the end user's account.

Notification engines 316 each include hardware and software components to achieve their corresponding mode of user notification. Examples of notification engines 316 include pager/text messaging, e-mail, phone messaging, fax messaging, and alarm-type signaling. In one example embodiment of system 300, end users 324 can select from various modes of notification, and can add or delete preferred modes at any time via a secure interface utilizing user interface 322. Those with ordinary skill in the art will recognize that a variety of devices and software applications are widely available that can support the various type of notification.

The network connectivity utilized by operator interface 314 can use any information-bearing connection, including commercially available internet or world wide web connection. The connection medium can be a copper-based conductor, optical, or wireless. The present invention is not limited to any particular connection type or information network, and in one example embodiment, secure access is available to administrators and end users. Connection to an area network can provide a messaging connection to end users 324.

One example notification process begins by user notification software 312 reading system database 308 to determine if a new event occurring in one or more receptacles of interest has been recorded. If a new event has been recorded for a receptacle of interest in database 308 since the last notification cycle, a cause notification is indicated. Alternatively, or in addition, an absence of an expected event or condition can be cause for notification. User notification software 312 performs the notification process according to one embodiment as follows. User notification software 312 utilizes an index representing each individual receptacle of receptacle array 302. As each individual receptacle is sequentially serviced by user notification software 312, the index increments to the next subsequent receptacle. At each index, user notification software 312 looks up the sensor information corresponding to the associated receptacle, and compares the current sensor information against the sensor information from at least one previous notification cycle. If the sensor information has changed significantly (such as in the case of a sensor state change, or sensor measurement exceeding a preconfigured threshold), the user notification software 312 looks up the notification preferences corresponding to the end user 324 associated with the receptacle of interest. User notification software 312 then issues a pre-selected series of notifications to the end user 324 via appropriate notification engines 316. Once completed, user notification software 312 moves onto the next receptacle's index. This process continues until all receptacles have been serviced. Notification engines 316 will process data for each notification cycle and will perform message notifications through the network connection, or to a direct-wired or wireless alarm mechanism based on the notification system configuration.

According to a variation of the example notification process described above, a detected sensor state change or measurement that meets certain criteria, as detected by acquisition hardware array 304 and data acquisition software 306 for a specified sensor type, triggers an instruction to user notification software 312 to issue an immediate notification. For example, if a smoke detector detects the presence of smoke in a particular receptacle, data acquisition software 306 will recognize this as an emergency condition, regardless of any historical data from that sensor. Data acquisition software 306 will issue a high-priority interrupt command to user notification software 312, which will respond by issuing a corresponding notification to emergency response personnel, receptacle array management, and the user 324, notwithstanding the current notification cycle that had been interrupted by the emergency event.

In one example embodiment, end users 324 also have an option to access the status of their receptacle(s) via web interface 322. Each end user 324 will have access to their receptacle status via a login and password-protected secure interface. Once the user 324 has passed entry verification, they may review the status of their receptacle. Two-way communications can be encrypted utilizing any suitable data security scheme. This feature allows yet another flexibility option for the end user 324. The end user may check the status of their receptacle at any time and as often he wishes.

In another example embodiment, managers of receptacle arrays can receive reports generated by user notification software 312 or by another software application that is either part of system 300, or local to the receptacle manager's workstation 320 and that has access to system database 308. These reports can include statistical information about the operation of receptacle array 302 or about the usage trends of any particular receptacle or group of receptacles. The information in such reports can be useful for improving system management or security.

Software Architecture

Figure 5:
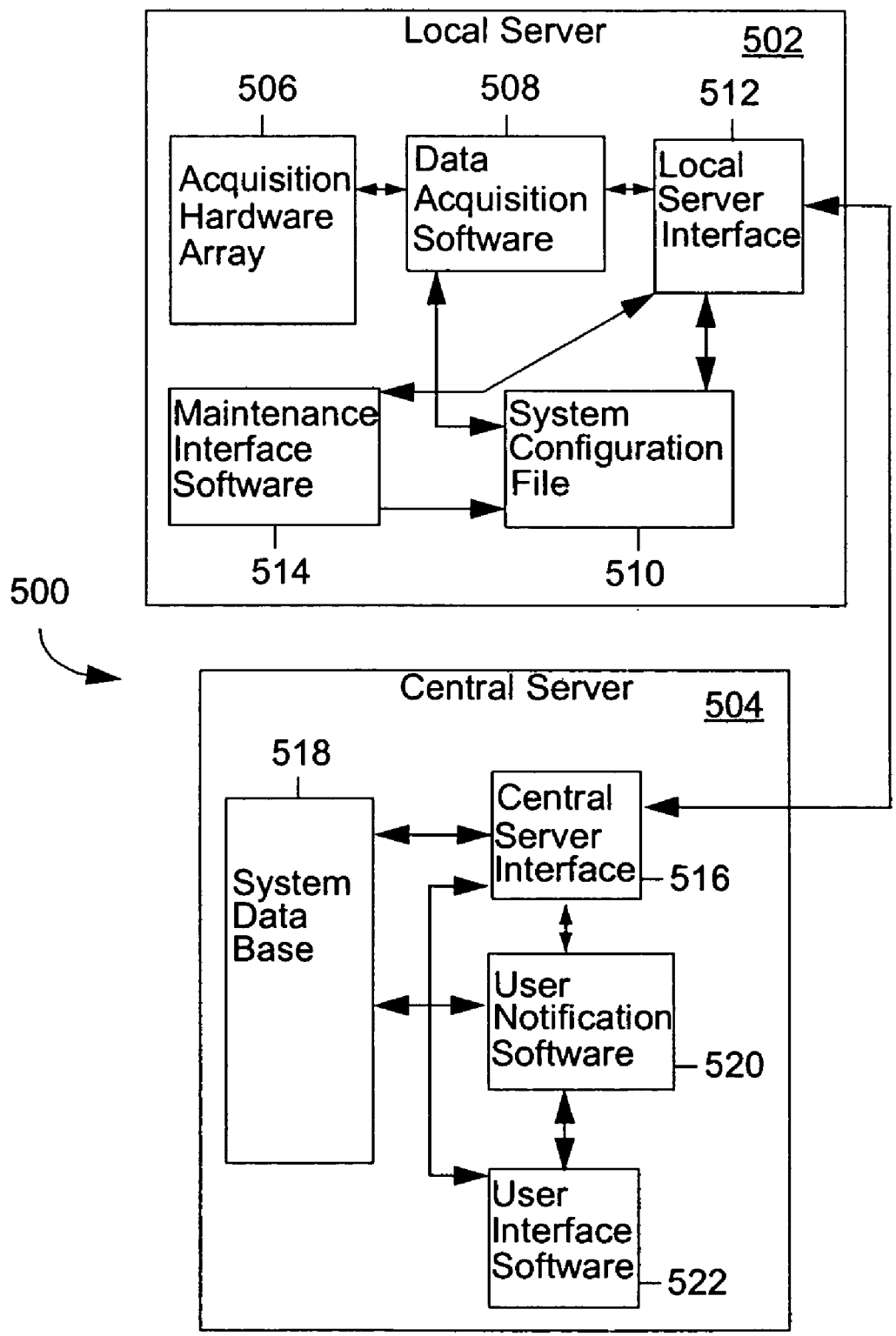
FIG. 5 is a block diagram illustrating an example software architecture according to one example embodiment.

FIG. 5 illustrates an acquisition and notification system software architecture 500 according to one example embodiment of the invention. In this embodiment, system software 500 is physically distributed among local server 502 and central server 504. Although a single local server is depicted in FIG. 5, persons of ordinary skill in the art will recognize that a plurality of local servers such as local server 502 could be simultaneously supported by central server 504. In one embodiment, local server 502 physically resides at the location of a receptacle array (such as receptacle array 302 in FIG. 3). In one embodiment, local server 504 includes a system console that facilitates system management access for receptacle array administrators.

The hardware of local server 502 includes acquisition hardware array 506 that interfaces with the sensors of the receptacle array (not shown). Data acquisition software 508 controls acquisition hardware array 506 based on information contained in system configuration file 510, and communicates acquired sensor information to central server 504 via local server interface 512. Local server 502 also includes maintenance interface software 514 for use by system administrators or receptacle array managers. In one example embodiment, maintenance interface software utilizes local server interface 512 to establish communications with system administrators or receptacle array managers. In an alternative embodiment, local server 502 includes a dedicated interface (not shown) for facilitating information exchange between maintenance software interface 514 and the authorized persons. In one example embodiment, maintenance interface software 514 provides a GUI-based interface. In another example embodiment, maintenance interface software 514 is adapted to interface with an automatic software application rather than with a human.

Figure 6A:
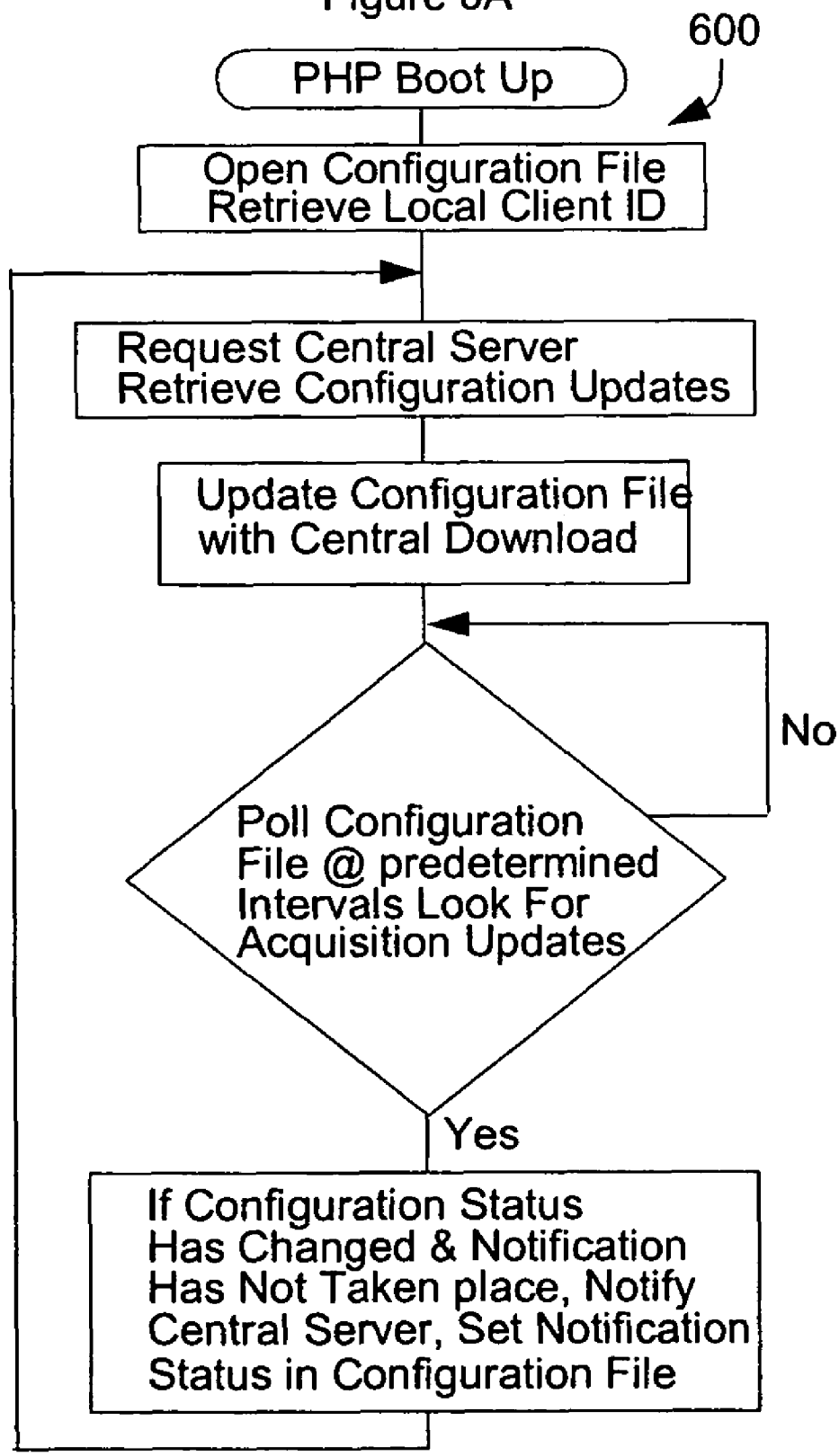
FIGS. 6A-6C are flow diagrams illustrating example operations of the software architecture of FIG. 5.

In one example embodiment, local server interface 512 utilizes a hypertext preprocessor (PHP) interface. FIG. 6A is a flow diagram illustrating an example update configuration sequence 600 for system configuration file 512 performed by maintenance interface software 514 and local server interface 512.

Figure 6B:
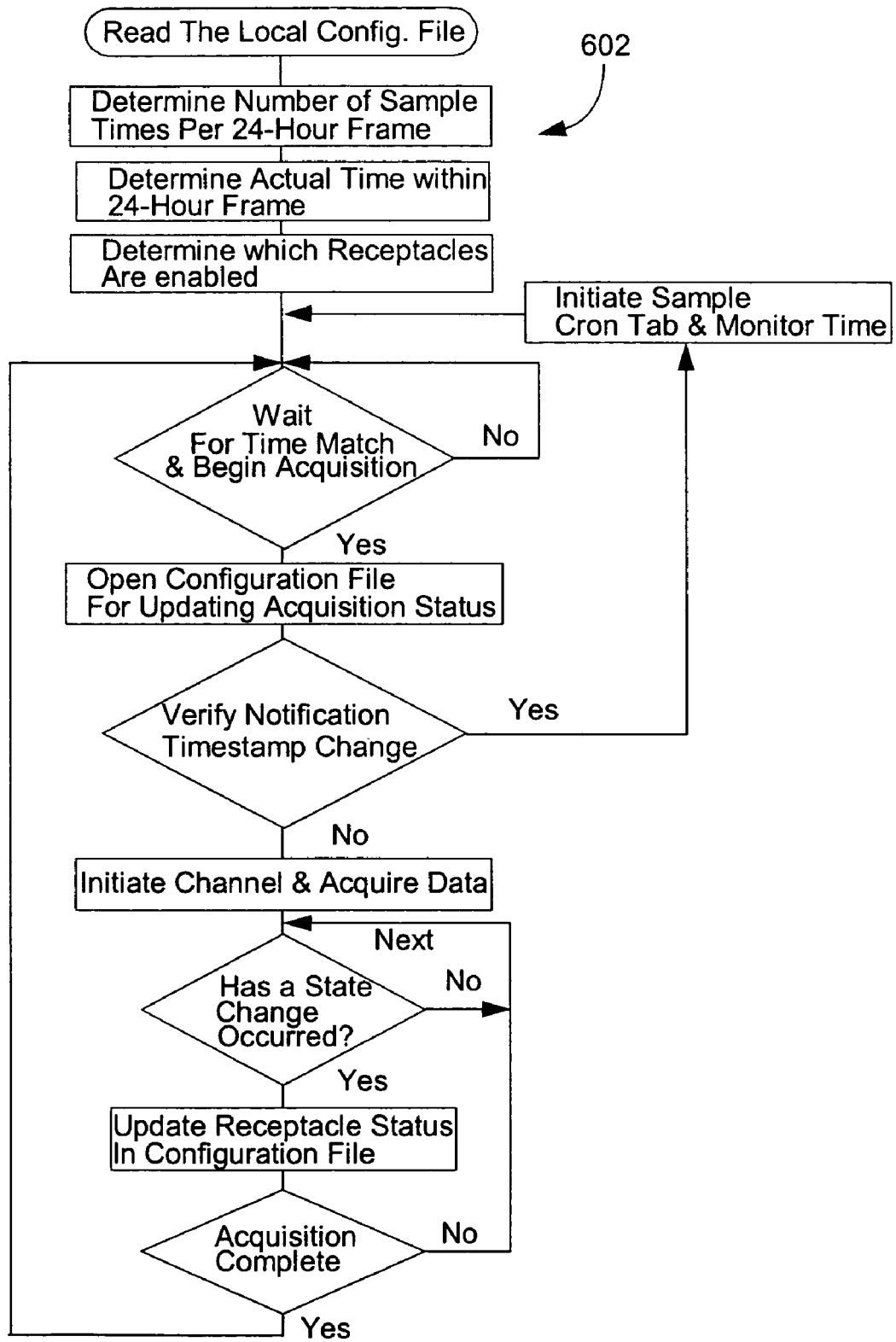

FIG. 6B illustrates an example acquisition sequence 602 performed by data acquisition software 508.

Figure 6C:
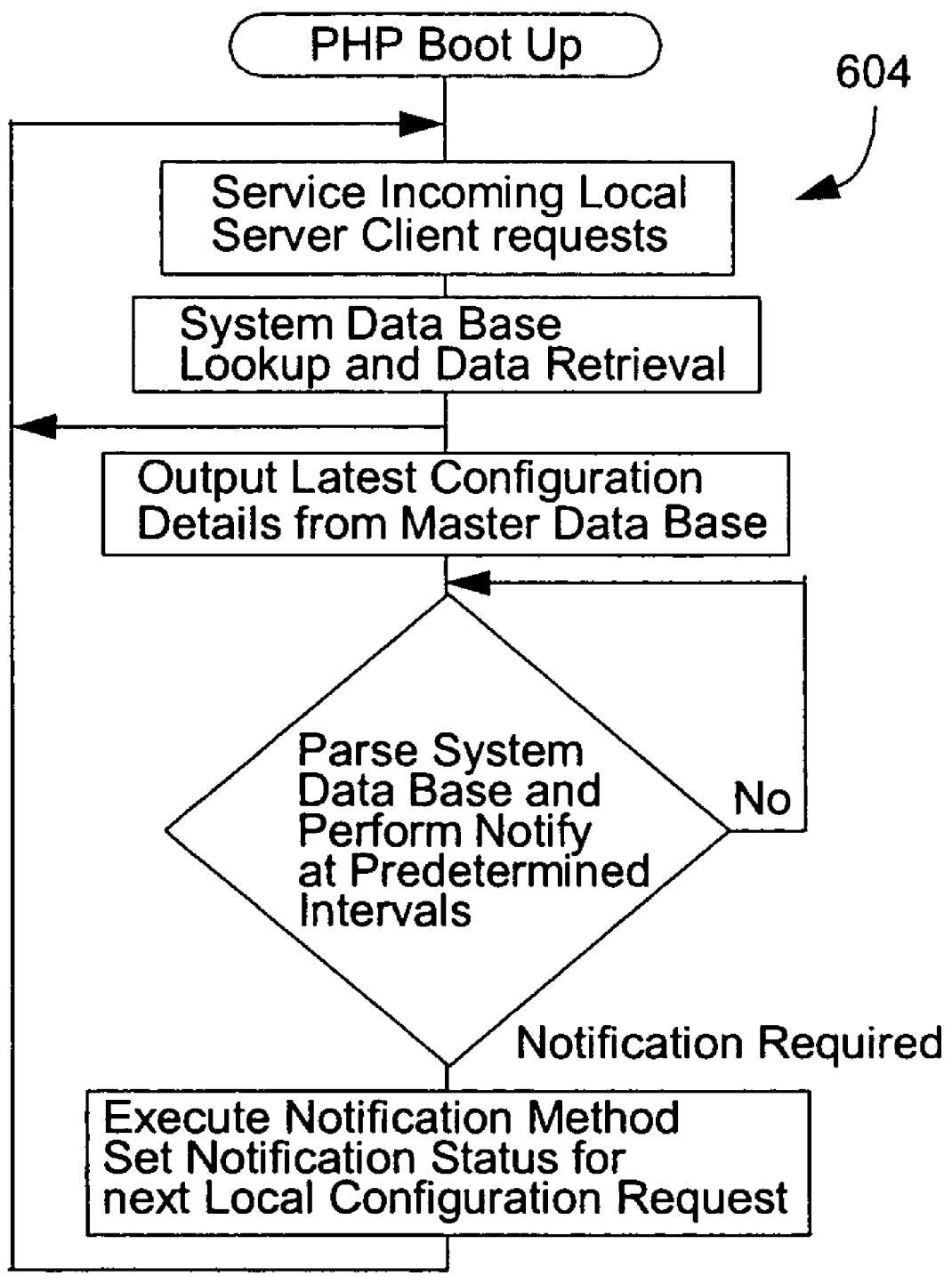

Referring again to FIG. 5, central server 504 communicates with one or more local servers 502 via central server interface 516. In one example embodiment, central server interface 516 utilizes a PHP interface. Central server 504 also includes system database 518. In one example embodiment, system database 518 includes receptacle array data and end user configuration data for all receptacle array sites supported by central server 504. Central server 504 also includes user notification software 520 that controls the user notification engines (not shown) and interfaces with system database 518 and local server 502 via central server interface 516 to communicate and receive configuration and sensor data. User notification software interfaces with end users via user interface software component 522. In one example embodiment, user interface software 522 utilizes central server interface 516 to communicate with end users. FIG. 6C illustrates an example central server sequence 604 performed by central server interface 516 and user notification software 520 for exchanging information with local server 502 and performing the appropriate user notification.

The invention may be embodied in other specific forms without departing from the essential attributes thereof; therefore, the illustrated embodiments should be considered in all respects as illustrative and not restrictive, such that the invention is limited only by the claims presented below.

What is claimed is:

1. A data acquisition and notification system adapted to be associated with at least one array of receptacles, the system comprising:

a sensor group of at least one sensor in each receptacle of the at least one array of receptacles, the sensor group adapted to detect a presence of a subject material placed in the receptacle, wherein at least one sensor of the sensor group includes an electromagnetic emitter and an electromagnetic detector arranged such that electromagnetic waves are emitted by the electromagnetic emitter and, if detectable subject material is present in the receptacle, the emitted electromagnetic waves reflect off of the subject material and those reflected electromagnetic waves are detected by the electromagnetic detector;

a system database configured to maintain data corresponding to sensor information from the at least one sensor;

monitoring hardware communicatively coupled to each sensor of the at least one array of receptacles and controlled by a data acquisition program that causes the monitoring hardware to gather sensor information from the sensor group and communicate the data representing the sensor information to the system database; and a notification system communicatively coupled to the system database and adapted to issue notifications via a communications medium based on the data maintained by the system database.

2. The system of claim 1, wherein the electromagnetic emitter comprises a light-emitting diode and wherein the electromagnetic detector comprises a photovoltaic cell.

3. The system of claim 1, wherein the sensor group corresponding to each receptacle includes a plurality of sensors.

4. The system of claim 3, further comprising decision logic configured to analyze multiple overlapping detections by the plurality of sensors of the sensor group to validate a positive detection.

5. The system of claim 1, wherein the receptacle has an interior that absorbs the electromagnetic waves emitted by the electromagnetic emitter such that, in an absence of any detectable subject material from the receptacle, the electromagnetic detector does not detect any significant portion of the emitted electromagnetic waves.

6. The system of claim 1, wherein each receptacle includes a sensor group of sensors situated in different planes.

7. The system of claim 1, wherein the electromagnetic emitter and the electromagnetic detector are situated along a common plane.

8. A data acquisition and notification system adapted to be associated with at least one array of receptacles, the system comprising:
a sensor group of a plurality of sensors including at least one sensor in each receptacle of the at least one array of receptacles, the sensor group adapted to detect a presence of a subject material placed in the receptacle, wherein at least one sensor of the sensor group includes a processor at the at least one sensor in each receptacle programmed to provide at least one data analysis and storage capability selected from the group consisting of: logic to aggregate data and provide a statistical computation, logic to validate a detection based on multiple overlapping events, logic to dynamically adjust decision criteria for that sensor, or any combination thereof;
monitoring hardware communicatively coupled to each sensor of the at least one array of receptacles and controlled by a data acquisition program that causes the monitoring hardware to gather sensor information from the sensor group; and
a notification system communicatively coupled to the monitoring hardware and adapted to issue notifications via a communications medium based on the sensor information.

9. The system of claim 8, wherein the at least one sensor includes an analog-to-digital converter (ADC) interfaced with a processor.

10. The system of claim 8, wherein the at least one sensor is configured to conduct communication with the monitoring hardware in communication cycles and gather and store sensor information between communication cycles.

11. The system of claim 8, wherein the at least one sensor is configured to communicate with the monitoring hardware via a data bus utilizing a burst mode of communications.

12. The system of claim 8, wherein the at least one sensor includes a plurality of like sensors within each receptacle.

13. The system of claim 8, further comprising:
a system database communicatively coupled to the monitoring hardware and to the notification system, the system database being configured to maintain data corresponding to sensor information from the at least one sensor and to provide that data to the notification system.

14. A data acquisition and notification system adapted to be associated with at least one array of receptacles, the system comprising:
a sensor group of at least one sensor in each receptacle of the at least one array of receptacles, the sensor group adapted to detect a presence of a subject material placed in the receptacle, wherein at least one sensor of the sensor group includes an electromagnetic emitter and an electromagnetic detector arranged such that electromagnetic waves are emitted by the electromagnetic emitter and, if detectable subject material is present in the receptacle, the emitted electromagnetic waves reflect off of the subject material and those reflected electromagnetic waves are detected by the electromagnetic detector; and
monitoring hardware operatively coupled to each sensor of the at least one array of receptacles and controlled by a data acquisition program that causes the monitoring hardware to gather sensor information from the sensor group and to communicate the sensor information to a notification system that is configured to issue notifications via a communications medium based on the sensor information.

15. The system of claim 14, wherein the electromagnetic emitter comprises a light-emitting diode and wherein the electromagnetic detector comprises a photovoltaic cell.

16. The system of claim 14, wherein the sensor group corresponding to each receptacle includes a plurality of sensors.

17. The system of claim 16, further comprising decision logic configured to analyze multiple overlapping detections by the plurality of sensors of the sensor group to validate a positive detection.

18. The system of claim 14, wherein the receptacle has an interior that absorbs the electromagnetic waves emitted by the electromagnetic emitter such that, in an absence of any detectable subject material from the receptacle, the electromagnetic detector does not detect any significant portion of the emitted electromagnetic waves.

19. The system of claim 14, wherein each receptacle includes a sensor group of sensors situated in different planes.

20. The system of claim 14, wherein the electromagnetic emitter and the electromagnetic detector are situated along a common plane.

* * * * *